US008418186B2

(12) United States Patent
Jackson

(10) Patent No.: US 8,418,186 B2
(45) Date of Patent: *Apr. 9, 2013

(54) SYSTEM AND METHOD OF CO-ALLOCATING A RESERVATION SPANNING DIFFERENT COMPUTE RESOURCES TYPES

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,417

(22) Filed: Jun. 27, 2011

(65) Prior Publication Data
US 2011/0258323 A1 Oct. 20, 2011

Related U.S. Application Data

(63) Continuation of application No. 10/530,582, filed as application No. PCT/US2005/008297 on Mar. 11, 2005, now Pat. No. 7,971, 204.

(60) Provisional application No. 60/552,653, filed on Mar. 13, 2004, provisional application No. 60/603,296, filed on Aug. 20, 2004.

(51) Int. Cl.
G06F 9/46 (2006.01)
G06F 15/173 (2006.01)
(52) U.S. Cl. .......................... 718/104; 709/223; 709/226
(58) Field of Classification Search .................. None
See application file for complete search history.

(56) References Cited

U.S. PATENT DOCUMENTS 5,175,800 A 12/1992 Gailis et al.
5,307,496 A 4/1994 Ichinose et al.
(Continued)

FOREIGN PATENT DOCUMENTS

GB 2392265 2/2004
WO WO 03/060798 9/2003
(Continued)

OTHER PUBLICATIONS

Chase et al., "Dynamic Virtual Clusters in a Grid Site Manager", Proceedings of the 12th IEEE International Symposium on High Performance Distributed Computing (HPDC'03), 2003.

(Continued)

Primary Examiner — Jennifer To

(57) ABSTRACT

A system and method of co-allocating resources within a compute environment are disclosed. The method embodiment of the invention comprises receiving a request for a reservation for a first type of resource, analyzing constraints and guarantees associated with the first type of resource, identifying a first group of resources that meet the request for the first type of resource and storing in a first list, receiving a request for a reservation for a second type of resource, analyzing constraints and guarantees associated with the second type of resource, identifying a second group of resources that meet the request for the second type of resource and storing in a second list, calculating a co-allocation parameter between the first group of resources and the second group of resources and reserving resources according to the calculated co-allocation parameter of the first group of resources and the second group of resources. The request may also request exclusivity of the reservation.

19 Claims, 6 Drawing Sheets

U.S. PATENT DOCUMENTS

| | | | |
|---|---|---|---|
| 5,355,508 A | 10/1994 | Kan | |
| 5,473,773 A | 12/1995 | Aman et al. | |
| 5,504,894 A | 4/1996 | Ferguson et al. | |
| 5,550,970 A | 8/1996 | Cline et al. | |
| 5,826,082 A | 10/1998 | Bishop et al. | |
| 5,881,238 A | 3/1999 | Aman et al. | |
| 5,918,017 A | 6/1999 | Attanasio et al. | |
| 5,920,863 A | 7/1999 | McKeehan et al. | |
| 5,933,417 A | 8/1999 | Rottoo | |
| 5,958,003 A | 9/1999 | Preining et al. | |
| 6,003,061 A | 12/1999 | Jones et al. | |
| 6,021,425 A | 2/2000 | Waldron, III et al. | |
| 6,067,545 A | 5/2000 | Wolff | |
| 6,076,174 A | 6/2000 | Freund | |
| 6,088,718 A | 7/2000 | Altschuler et al. | |
| 6,098,090 A | 8/2000 | Burns | |
| 6,101,508 A | 8/2000 | Wolff | |
| 6,167,445 A | 12/2000 | Gai et al. | |
| 6,212,542 B1 | 4/2001 | Kahle et al. | |
| 6,278,712 B1 | 8/2001 | Takihiro et al. | |
| 6,298,352 B1 | 10/2001 | Kannan et al. | |
| 6,314,555 B1 | 11/2001 | Ndumu et al. | |
| 6,324,279 B1 | 11/2001 | Kamanek, Jr. et al. | |
| 6,330,008 B1 | 12/2001 | Razdow et al. | |
| 6,330,583 B1 | 12/2001 | Reiffin | |
| 6,333,936 B1 | 12/2001 | Johansson et al. | |
| 6,334,114 B1 | 12/2001 | Jacobs et al. | |
| 6,366,945 B1 | 4/2002 | Fong et al. | |
| 6,370,154 B1 | 4/2002 | Wickham | |
| 6,374,297 B1 | 4/2002 | Wolf et al. | |
| 6,418,459 B1 | 7/2002 | Gulick | |
| 6,460,082 B1 * | 10/2002 | Lumelsky et al. | 709/226 |
| 6,463,454 B1 | 10/2002 | Lumelsky et al. | |
| 6,496,566 B1 | 12/2002 | Posthuma | |
| 6,496,866 B2 | 12/2002 | Attanasio et al. | |
| 6,519,571 B1 | 2/2003 | Guheen et al. | |
| 6,526,442 B1 | 2/2003 | Stupek, Jr. et al. | |
| 6,564,261 B1 | 5/2003 | Gudjonsson et al. | |
| 6,571,215 B1 | 5/2003 | Mahapatro | |
| 6,584,489 B1 | 6/2003 | Jones et al. | |
| 6,587,938 B1 | 7/2003 | Eilert et al. | |
| 6,590,587 B1 | 7/2003 | Wichelman et al. | |
| 6,662,202 B1 | 12/2003 | Krusche et al. | |
| 6,662,219 B1 | 12/2003 | Nishanov et al. | |
| 6,687,257 B1 | 2/2004 | Balasubramanian | |
| 6,690,400 B1 | 2/2004 | Moayyad et al. | |
| 6,760,306 B1 | 7/2004 | Pan et al. | |
| 6,771,661 B1 | 8/2004 | Chawla et al. | |
| 6,829,762 B2 | 12/2004 | Arimilli et al. | |
| 6,854,013 B2 * | 2/2005 | Cable et al. | 709/226 |
| 6,912,533 B1 | 6/2005 | Hornick | |
| 6,925,431 B1 | 8/2005 | Papaefstathiou | |
| 6,938,256 B2 | 8/2005 | Deng et al. | |
| 6,948,171 B2 | 9/2005 | Dan et al. | |
| 6,966,033 B1 | 11/2005 | Gasser et al. | |
| 6,975,609 B1 | 12/2005 | Khaleghi et al. | |
| 6,985,937 B1 | 1/2006 | Keshav et al. | |
| 7,003,414 B1 | 2/2006 | Wichelman et al. | |
| 7,035,230 B1 | 4/2006 | Shaffer et al. | |
| 7,072,807 B2 | 7/2006 | Brown et al. | |
| 7,124,410 B2 | 10/2006 | Berg et al. | |
| 7,143,168 B1 | 11/2006 | DiBiasio et al. | |
| 7,145,995 B2 | 12/2006 | Oltmanns et al. | |
| 7,168,049 B2 | 1/2007 | Day | |
| 7,177,823 B2 | 2/2007 | Lam et al. | |
| 7,185,073 B1 | 2/2007 | Gai et al. | |
| 7,188,174 B2 | 3/2007 | Rolia et al. | |
| 7,191,244 B2 | 3/2007 | Jennings et al. | |
| 7,197,561 B1 | 3/2007 | Lovy et al. | |
| 7,222,343 B2 | 5/2007 | Heyman et al. | |
| 7,236,915 B2 | 6/2007 | Algieri et al. | |
| 7,289,619 B2 | 10/2007 | Vivadelli et al. | |
| 7,296,268 B2 | 11/2007 | Darling et al. | |
| 7,308,687 B2 | 12/2007 | Trossman et al. | |
| 7,328,406 B2 | 2/2008 | Kalinoski et al. | |
| 7,353,495 B2 | 4/2008 | Somgyi | |
| 7,376,693 B2 | 5/2008 | Neiman et al. | |
| 7,386,586 B1 | 6/2008 | Headley et al. | |
| 7,386,850 B2 | 6/2008 | Mullen | |
| 7,403,994 B1 | 7/2008 | Vogl et al. | |
| 7,423,971 B1 | 9/2008 | Mohaban et al. | |
| 7,502,747 B1 | 3/2009 | Pardo et al. | |
| 7,502,884 B1 | 3/2009 | Shah et al. | |
| 7,516,455 B2 | 4/2009 | Matheson et al. | |
| 7,546,553 B2 | 6/2009 | Bozak et al. | |
| 7,568,199 B2 | 7/2009 | Bozak et al. | |
| 7,640,547 B2 * | 12/2009 | Neiman et al. | 718/104 |
| 7,716,193 B2 | 5/2010 | Krishnamoorthy | |
| 2002/0007389 A1 | 1/2002 | Jones et al. | |
| 2002/0031364 A1 | 3/2002 | Suzuki et al. | |
| 2002/0087699 A1 | 7/2002 | Karagiannis et al. | |
| 2002/0099842 A1 | 7/2002 | Jennings et al. | |
| 2002/0116234 A1 | 8/2002 | Nagasawa | |
| 2002/0120741 A1 | 8/2002 | Webb et al. | |
| 2002/0156904 A1 | 10/2002 | Gullotta et al. | |
| 2002/0166117 A1 | 11/2002 | Abrams et al. | |
| 2003/0005130 A1 | 1/2003 | Cheng | |
| 2003/0018766 A1 | 1/2003 | Duvvuru | |
| 2003/0018803 A1 | 1/2003 | El Batt et al. | |
| 2003/0028645 A1 | 2/2003 | Romagnoli | |
| 2003/0061260 A1 | 3/2003 | Rajkumar | |
| 2003/0061262 A1 | 3/2003 | Hahn et al. | |
| 2003/0088457 A1 | 5/2003 | Keil et al. | |
| 2003/0126200 A1 | 7/2003 | Wolff | |
| 2003/0131043 A1 | 7/2003 | Berg et al. | |
| 2003/0135615 A1 | 7/2003 | Wyatt | |
| 2003/0135621 A1 | 7/2003 | Romagnoli | |
| 2003/0154112 A1 | 8/2003 | Neiman et al. | |
| 2003/0158884 A1 | 8/2003 | Alford | |
| 2003/0169269 A1 | 9/2003 | Sasaki et al. | |
| 2003/0182425 A1 | 9/2003 | Kurakake | |
| 2003/0185229 A1 | 10/2003 | Shachar et al. | |
| 2003/0200109 A1 | 10/2003 | Honda et al. | |
| 2003/0212792 A1 | 11/2003 | Raymond | |
| 2003/0216951 A1 | 11/2003 | Ginis et al. | |
| 2003/0217129 A1 | 11/2003 | Knittel et al. | |
| 2003/0233378 A1 | 12/2003 | Butler et al. | |
| 2003/0233446 A1 | 12/2003 | Earl | |
| 2004/0030741 A1 | 2/2004 | Wolton et al. | |
| 2004/0044718 A1 | 3/2004 | Fertl et al. | |
| 2004/0064817 A1 | 4/2004 | Shibayama et al. | |
| 2004/0103339 A1 | 5/2004 | Chalasani et al. | |
| 2004/0103413 A1 | 5/2004 | Mandava et al. | |
| 2004/0107281 A1 | 6/2004 | Bose et al. | |
| 2004/0117768 A1 | 6/2004 | Chang et al. | |
| 2004/0139202 A1 | 7/2004 | Talwar et al. | |
| 2004/0139464 A1 | 7/2004 | Ellis et al. | |
| 2004/0196308 A1 | 10/2004 | Blomquist | |
| 2004/0205101 A1 | 10/2004 | Radhakrishnan | |
| 2004/0215780 A1 | 10/2004 | Kawato | |
| 2004/0216121 A1 | 10/2004 | Jones et al. | |
| 2004/0236852 A1 | 11/2004 | Birkestrand et al. | |
| 2004/0244006 A1 | 12/2004 | Kaufman et al. | |
| 2004/0260746 A1 | 12/2004 | Brown et al. | |
| 2005/0027864 A1 | 2/2005 | Bozak et al. | |
| 2005/0050270 A1 | 3/2005 | Horn et al. | |
| 2005/0071843 A1 | 3/2005 | Guo et al. | |
| 2005/0155033 A1 | 7/2005 | Luoffo et al. | |
| 2005/0228892 A1 | 10/2005 | Riley et al. | |
| 2005/0256942 A1 | 11/2005 | McCardle et al. | |
| 2005/0278760 A1 | 12/2005 | Dewar et al. | |
| 2005/0283534 A1 | 12/2005 | Bigagli et al. | |
| 2005/0283782 A1 | 12/2005 | Lu et al. | |
| 2006/0013132 A1 | 1/2006 | Garnett et al. | |
| 2006/0097863 A1 | 5/2006 | Horowitz et al. | |
| 2006/0200773 A1 | 9/2006 | Nocera et al. | |
| 2006/0236368 A1 | 10/2006 | Raja et al. | |
| 2006/0271552 A1 | 11/2006 | McChesney et al. | |
| 2006/0294238 A1 | 12/2006 | Naik et al. | |
| 2007/0204036 A1 | 8/2007 | Mohaban et al. | |
| 2008/0168451 A1 | 7/2008 | Challenger et al. | |
| 2008/0184248 A1 | 7/2008 | Barua et al. | |
| 2008/0216082 A1 * | 9/2008 | Eilam et al. | 718/104 |
| 2008/0288873 A1 | 11/2008 | McCardle et al. | |
| 2009/0216881 A1 | 8/2009 | Lovy et al. | |

FOREIGN PATENT DOCUMENTS

| WO | WO 2004/021109 | 3/2004 |
|----|----------------|--------|
| WO | WO 2004/046919 | 6/2004 |

OTHER PUBLICATIONS

Chuang Liu et al. "Design and Evaluation of a Resource Selection Framework for Grid Applications" High Performance Distributed Computing, 2002. HPDC-11 2002. Proceedings S. 11$^{th}$ IEEE International Symposium on Jul. 23-26, 2002, Piscataway, NJ, USA IEEE, Jul. 23, 2002, pp. 63-72, XP010601162 ISBN: 978-0-7695-1686-8.

Lars C. Wolf et al. "Concepts for Resource Reservation in Advance" Multimedia Tools and Applications, [Online] 1997, pp. 255-278, XP009102070 The Netherlands Retrieved from the Internet: URL: http://www.springerlink.com/content/h25481221mu22451/fulltext.pdf [retrieved on Jun. 23, 2008].

Si et al., "Language Modeling Framework for Resource Selection and Results Merging", SIKM 2002, Proceedings of the eleventh international conference on Information and Knowledge Management.

Luo et al., A Language Modeling Framework for Resource Selection and Results Merging Conference on Information and Knowledge Management, 2002, ACM, pp. 391-397.

Leinberger, W. et al., "Gang Scheduling for Distributed Memory Systems", University of Minnesota—Computer Science and Engineering—Technical Report, Feb. 16, 2000, vol. TR 00-014.

Brad Stone et al., UNIX Fault Management: A Guide for System Administration, Dec. 1, 1999, ISBN 0-13-026525-X, http://www.informit.com/content/images/013026525X/samplechapter/013026525.pdf.

IBM Tivoli Workload Scheduler job Scheduling Console User's Guide Feature Level 1.2 (Maintenance Release Oct. 2003), IBM Corporation, http://publib.boulder.ibm.com/tividd/td/TWS/SH19-4552-01/en_US/PDF/jsc_user.pdf.

Chen et al., "A flexible service model for advance reservation", Computer Networks, Elsevier science publishers, vol. 37, No. 3-4, pp. 251-262, Nov. 5, 2001.

Roy, Alain, "Advance Reservation API", University of Wisconsin-Madison, GFD-E.5, Scheduling Working Group, May 23, 2002.

Supercluster Research and Development Group, "Maui Administrator's Guide", Internet citation, 2002.

Snell, et al., "The Performance Impact of Advance Reservation Metascheduling", pp. 137-153, Springer-Verlag Berlin Heidelberg, 2000.

* cited by examiner

US 8,418,186 B2

SYSTEM AND METHOD OF CO-ALLOCATING A RESERVATION SPANNING DIFFERENT COMPUTE RESOURCES TYPES

PRIORITY CLAIM

The present application is a continuation of U.S. patent application Ser. No. 10/530,582, filed Aug. 11, 2006, now U.S. Pat. No. 7,971,204, which is a national stage application of PCT/US05/08297, filed Mar. 11, 2005, which claims priority to U.S. Provisional Application No. 60/552,653 filed Mar. 13, 2004, the contents of which are incorporated herein by reference. The present application and which also cites priority to U.S. Provisional Application No. 60/603,296, filed Aug. 20, 2004. The contents of each of the above applications which are incorporated herein by reference.

RELATED APPLICATIONS

The present application is related to U.S. patent application Ser. No. 10/530,583, now U.S. Pat. No. 7,620,706; U.S. patent application Ser. No. 10/530,581, pending; U.S. patent application Ser. No. 10/530,577, pending; U.S. patent application Ser. No. 10/530,576, pending; U.S. patent application Ser. No. 10/589,339, now U.S. Pat. No. 7,490,325; U.S. patent application Ser. No. 10/530,578, now U.S. Pat. No. 8,151,103; and U.S. patent application Ser. No. 10/530,580, pending, U.S. patent application Ser. No. 10/530,575, now U.S. Pat. No. 8,108,869, filed on the same day as the present application. The content of each of these cases is incorporated herein by reference.

BACKGROUND OF THE INVENTION

1. Field of the Invention

The present invention relates to reservations of resources within a compute environment such as a cluster or grid and more specifically to a system and method of providing a co-allocation reservation spanning different resource types.

2. Introduction

There are challenges in the complex process of managing the consumption of resources within a compute environment such as a grid, compute farm or cluster of computers. Grid computing may be defined as coordinated resource sharing and problem solving in dynamic, multi-institutional collaborations. Many computing projects require much more computational power and resources than a single computer may provide. Networked computers with peripheral resources such as printers, scanners, I/O devices, storage disks, scientific devices and instruments, etc. may need to be coordinated and utilized to complete a task. The term compute resource generally refers to computer processors, network bandwidth, and any of these peripheral resources as well. A compute farm may comprise a plurality of computers coordinated for such purposes of handling Internet traffic. The web search website Google® had a compute farm used to process its network traffic and Internet searches.

Grid/cluster resource management generally describes the process of identifying requirements, matching resources to applications, allocating those resources, and scheduling and monitoring grid resources over time in order to run grid applications or jobs submitted to the compute environment as efficiently as possible. Each project or job will utilize a different set of resources and thus is typically unique. For example, a job may utilize computer processors and disk space, while another job may require a large amount of network bandwidth and a particular operating system. In addition to the challenge of allocating resources for a particular job or a request for resources, administrators also have difficulty obtaining a clear understanding of the resources available, the current status of the compute environment and available resources, and real-time competing needs of various users. One aspect of this process is the ability to reserve resources for a job. A cluster manager will seek to reserve a set of resources to enable the cluster to process a job at a promised quality of service.

General background information on clusters and grids may be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable, although they have different connotations. For example, when a grid is referred to as receiving a request for resources and the request is processed in a particular way, the same method may also apply to other compute environments such as a cluster or a compute farm. A cluster is generally defined as a collection of compute nodes organized for accomplishing a task or a set of tasks. In general, a grid will comprise a plurality of clusters as will be shown in FIG. 1A. Several general challenges exist when attempting to maximize resources in a grid. First, there are typically multiple layers of grid and cluster schedulers. A grid 100 generally comprises a group of clusters or a group of networked computers. The definition of a grid is very flexible and may mean a number of different configurations of computers. The introduction here is meant to be general given the variety of configurations that are possible. A grid scheduler 102 communicates with a plurality of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which may refer to either the cluster schedulers 104 or the resource managers 106) are closer to the specific resources 108 and may not allow grid schedulers 102 direct access to the resources. The grid level scheduler 102 typically does not own or control the actual resources. Therefore, jobs are submitted from the high level grid-scheduler 102 to a local set of resources with no more permissions that then user would have. This reduces efficiencies and can render the reservation process more difficult.

The heterogeneous nature of the shared compute resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies may also play a role in performance.

Within a given cluster, there is only a concept of resource management in space. An administrator can partition a cluster and identify a set of resources to be dedicated to a particular purpose and another set of resources can be dedicated to another purpose. In this regard, the resources are reserved in advance to process the job. There is currently no ability to identify a set of resources over a time frame for a purpose. By being constrained in space, the nodes 108A, 108B, 108C, if they need maintenance or for administrators to perform work or provisioning on the nodes, have to be taken out of the system, fragmented permanently or partitioned permanently for special purposes or policies. If the administrator wants to dedicate them to particular users, organizations or groups, the prior art method of resource management in space causes too much management overhead requiring a constant adjustment the configuration of the cluster environment and also losses in efficiency with the fragmentation associated with meeting particular policies.

To manage the jobs submissions or requests for resources within a cluster, a cluster scheduler will employ reservations to insure that jobs will have the resources necessary for processing. FIG. 1B illustrates a cluster/node diagram for a cluster 124 with nodes 120. Time is along the X axis. An access control list 114 (ACL) to the cluster is static, meaning that the ACL is based on the credentials of the person, group, account, class or quality of service making the request or job submission to the cluster. The ACL 114 determines what jobs get assigned to the cluster 110 via a reservation 112 shown as spanning into two nodes of the cluster. Either the job can be allocated to the cluster or it can't and the decision is determined based on who submits the job at submission time. The deficiency with this approach is that there are situations in which organizations would like to make resources available but only in such a way as to balance or meet certain performance goals. Particularly, groups may want to establish a constant expansion factor and make that available to all users or they may want to make a certain subset of users that are key people in an organization and want to give them special services but only when their response time drops below a certain threshold. Given the prior art model, companies are unable to have the flexibility over their cluster resources.

To improve the management of compute resources, what is needed in the art is a method for a scheduler, such as a grid scheduler, a cluster scheduler or cluster workload management system to manage resources more efficiently. Furthermore, given the complexity of the cluster environment, what is needed is more power and flexibility in the reservations process.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention has system, method and computer-readable media embodiments. The method embodiment of the invention comprises method of co-allocating resources within a compute environment. The compute environment may be a grid, a cluster or some other grouping of compute devices. The method comprises receiving a request for a reservation for a first type of resource and analyzing constraints and guarantees associated with the first type of resource. A system practicing the invention identifies a first group of resources that meet the request for the first type of resource and storing in a first list, receives a request for a reservation for a second type of resource, analyzes constraints and guarantees associated with the second type of resource and identifies a second group of resources that meet the request for the second type of resource and stores in a second list. Finally, the system calculates a co-allocation parameter between the first group of resources and the second group of resources and reserves resources according to the calculated co-allocation parameter of the first group of resources and the second group of resources.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1A:
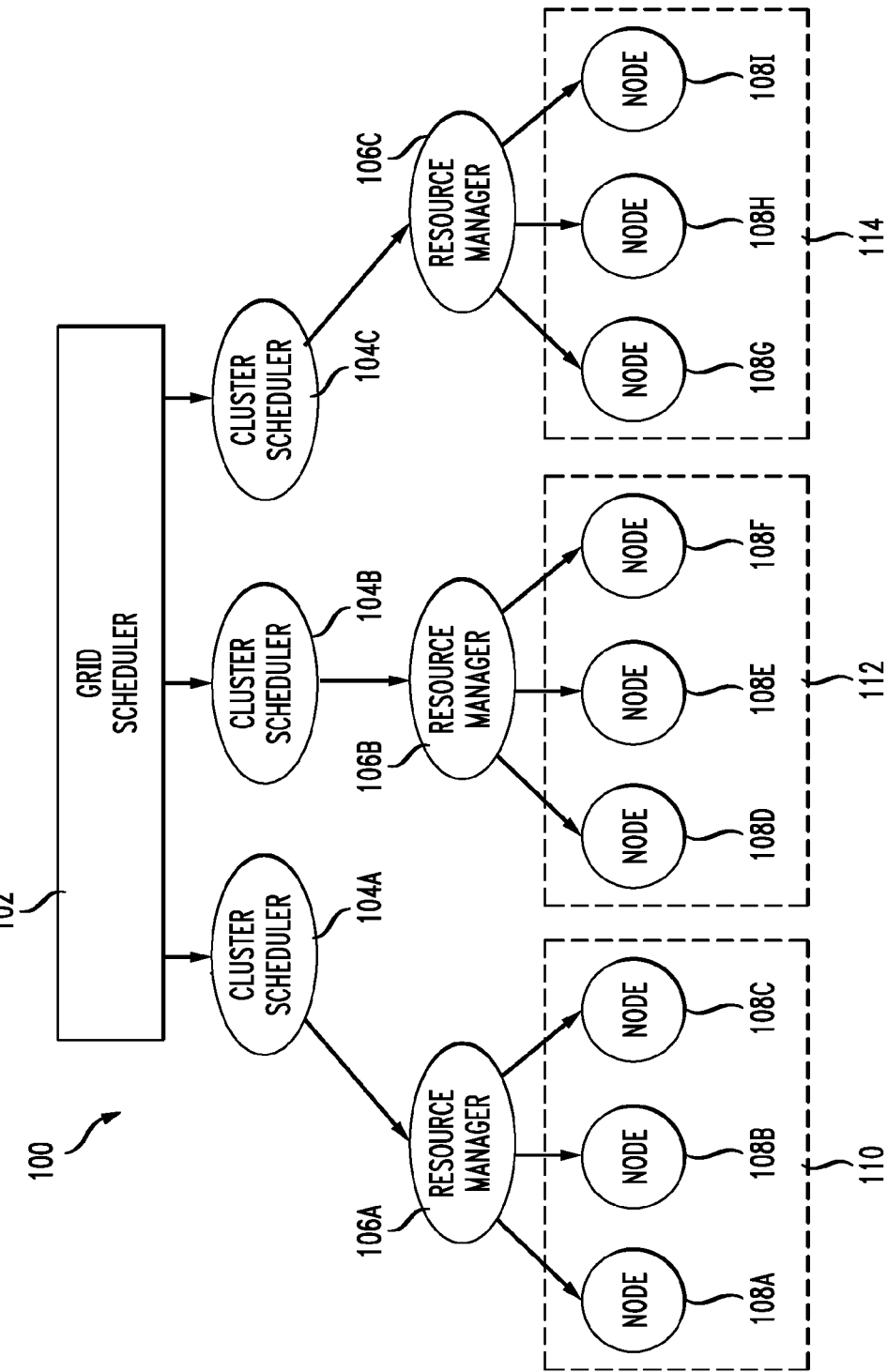
FIG. 1A illustrates a prior art arrangement of a grid scheduler, cluster scheduler and nodes.
Figure 1B:
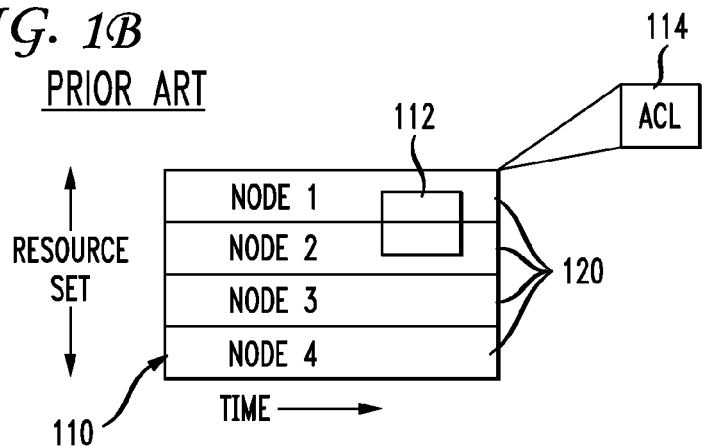
FIG. 1B illustrates an access control list which provides access to resources within a compute environment.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The "system" embodiment of the invention may comprise a computing device that includes the necessary hardware and software components to enable a workload manager or a software module performing the steps of the invention. Such a computing device may include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiment of the invention has any specific hardware components and any known or future developed hardware configurations are contemplated as within the scope of the invention when the computing device operates as is claimed.

The present invention relates to reservations of resources within the context of a compute environment. One example of a compute environment is a cluster. The cluster may be, for example, a group of computing devices operated by a hosting facility, a hosting center, a virtual hosting center, a data center, grid and/or utility-based computing environments. Every reservation consists of three major components: a set of resources, a timeframe, and an access control list (ACL). Additionally, a reservation may also have a number of optional attributes controlling its behavior and interaction with other aspects of scheduling. A reservation's ACL specifies which jobs can use the reservation. Only jobs which meet one or more of a reservation's access criteria are allowed to use the reserved resources during the reservation timeframe. The reservation access criteria comprises, in one example, at least following: users, groups, accounts, classes, quality of service (QOS) and job duration. A job may be any venue or end of consumption of resource for any broad purpose, whether it be for a batch system, direct volume access or other service provisioning.

A workload manager, or scheduler, will govern access to the compute environment by receiving requests for reservations of resources and creating reservations for processing jobs. A workload manager functions by manipulating five primary, elementary objects. These are jobs, nodes, reservations, QOS structures, and policies. In addition to these, multiple minor elementary objects and composite objects are also utilized. These objects are also defined in a scheduling dictionary.

A workload manager may operate on a single computing device or multiple computing devices to manage the workload of a compute environment. The "system" embodiment of the invention may comprise a computing device that includes the necessary hardware and software components to enable a workload manager or a software module performing the steps of the invention. Such a computing device may include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiment of the invention has any specific hardware components and any known or future developed hardware configurations are contemplated as within the scope of the invention when the computing device operates as is claimed.

Job information is provided to the workload manager scheduler from a resource manager such as Loadleveler, Portable Batch System (PBS), Wiki, or Platform's LSF products. Those of skill in the art will be familiar with each of these software products. Job attributes include ownership of the job, job state, amount and type of resources required by the job, required criteria (I need this job finished in 1 hour), preferred criteria (I would like this job to complete in ½ hour) and a wallclock limit, indicating how long the resources are required. A job consists of one or more requirements each of which requests a number of resources of a given type. For example, a job may consist of two requirements, the first asking for '1 IBM node with at least 512 MB of RAM' and the second asking for '24 IBM nodes with at least 128 MB of RAM'. Each requirement consists of one or more tasks where a task is defined as the minimal independent unit of resources. A task is a collection of elementary resources which must be allocated together within a single node. For example, a task may consist of one processor, 512 MB or memory, and 2 GB of local disk. A task may also be just a single processor. In symmetric multiprocessor (SMP) environments, however, users may wish to tie one or more processors together with a certain amount of memory and/or other resources. A key aspect of a task is that the resources associated with the task must be allocated as an atomic unit, without spanning node boundaries. A task requesting 2 processors cannot be satisfied by allocating 2 uni-processor nodes, nor can a task requesting 1 processor and 1 GB of memory be satisfied by allocating 1 processor on one node and memory on another.

A job requirement (or req) consists of a request for a single type of resources. Each requirement consists of the following components: (1) a task definition is a specification of the elementary resources which compose an individual task; (2) resource constraints provide a specification of conditions which must be met in order for resource matching to occur. Only resources from nodes which meet all resource constraints may be allocated to the job requirement; (3) a task count relates to the number of task instances required by the requirement; (4) a task List is a list of nodes on which the task instances have been located; and (5) requirement statistics are statistics tracking resource utilization.

As far as the workload manager is concerned, a node is a collection of resources with a particular set of associated attributes. In most cases, it fits nicely with the canonical world view of a node such as a PC cluster node or an SP node. In these cases, a node is defined as one or more CPU's, memory, and possibly other compute resources such as local disk, swap, network adapters, software licenses, etc. Additionally, this node will described by various attributes such as an architecture type or operating system. Nodes range in size from small uni-processor PC's to large SMP systems where a single node may consist of hundreds of CPU's and massive amounts of memory.

Information about nodes is provided to the scheduler chiefly by the resource manager. Attributes include node state, configured and available resources (i.e., processors, memory, swap, etc.), run classes supported, etc.

Policies are generally specified via a configuration file and serve to control how and when jobs start. Policies include, but are not limited to, job prioritization, fairness policies, fairshare configuration policies, and scheduling policies. Jobs, nodes, and reservations all deal with the abstract concept of a resource. A resource in the workload manager world is one of the following: (1) processors which are specified with a simple count value; (2) memory such as real memory or 'RAM' is specified in megabytes (MB); (3) swap which is virtual memory or 'swap' is specified in megabytes (MB); and (4) disk space such as a local disk is specified in megabytes (MB) or gigabytes (GB). In addition to these elementary resource types, there are two higher level resource concepts used within workload manager. These are the task and the processor equivalent (PE).

In a workload manager, jobs or reservations that request resources make such a request in terms of tasks typically using a task count and a task definition. By default, a task maps directly to a single processor within a job and maps to a full node within reservations. In all cases, this default definition can be overridden by specifying a new task definition. Within both jobs and reservations, depending on task definition, it is possible to have multiple tasks from the same job mapped to the same node. For example, a job requesting 4 tasks using the default task definition of 1 processor per task, can be satisfied by two dual processor nodes.

The concept of the PE arose out of the need to translate multi-resource consumption requests into a scalar value. It is not an elementary resource, but rather, a derived resource metric. It is a measure of the actual impact of a set of requested resources by a job on the total resources available system wide. It is calculated as:

PE=MAX(ProcsRequestedByJob/TotalConfiguredProcs, MemoryRequestedByJob/TotalConfiguredMemory, DiskRequestedByJob/TotalConfiguredDisk, SwapRequestedByJob/TotalConfiguredSwap)*TotalConfiguredProcs For example, say a job requested 20% of the total processors and 50% of the total memory of a 128 processor MPP system. Only two such jobs could be supported by this system. The job is essentially using 50% of all available resources since the system can only be scheduled to its most constrained resource, in this case memory. The processor equivalents for this job should be 50% of the PE=64.

A further example will be instructive. Assume a homogeneous 100 node system with 4 processors and 1 GB of memory per node. A job is submitted requesting 2 processors and 768 MB of memory. The PE for this job would be calculated as:

$$PE=MAX(2/(100*4), 768/(100*1024))*(100*4)=3.$$

This result makes sense since the job would be consuming ¾ of the memory on a 4 processor node. The calculation works equally well on homogeneous or heterogeneous systems, uni-processor or large way SMP systems.

A class (or queue) is a logical container object which can be used to implicitly or explicitly apply policies to jobs. In most cases, a class is defined and configured within the resource manager and associated with one or more of the attributes or constraints shown in Table 1 below.

TABLE 1

Attributes of a Class

| Attribute | Description |
| --- | --- |
| Default Job Attributes | A queue may be associated with a default job duration, default size, or default resource requirements |
| Host Constraints | A queue may constrain job execution to a particular set of hosts |
| Job Constraints | A queue may constrain the attributes of jobs which may submitted including setting limits such as max wallclock time, minimum number of processors, etc. |
| Access List | A queue may constrain who may submit jobs into it based on user lists, group lists, etc. |
| Special Access | A queue may associate special privileges with jobs including adjusted job priority. |

As stated previously, most resource managers allow full class configuration within the resource manager. Where additional class configuration is required, the CLASSCFG parameter may be used. The workload manager tracks class usage as a consumable resource allowing sites to limit the number of jobs using a particular class. This is done by monitoring class initiators which may be considered to be a ticket to run in a particular class. Any compute node may simultaneously support several types of classes and any number of initiators of each type. By default, nodes will have a one-to-one mapping between class initiators and configured processors. For every job task run on the node, one class initiator of the appropriate type is consumed. For example, a three processor job submitted to the class batch will consume three batch class initiators on the nodes where it is run.

Using queues as consumable resources allows sites to specify various policies by adjusting the class initiator to node mapping. For example, a site running serial jobs may want to allow a particular 8 processor node to run any combination of batch and special jobs subject to the following constraints:

only 8 jobs of any type allowed simultaneously
no more than 4 special jobs allowed simultaneously To enable this policy, the site may set the node's MAXJOB policy to 8 and configure the node with 4 special class initiators and 8 batch class initiators. Note that in virtually all cases jobs have a one-to-one correspondence between processors requested and class initiators required. However, this is not a requirement and, with special configuration sites may choose to associate job tasks with arbitrary combinations of class initiator requirements.

In displaying class initiator status, workload manager signifies the type and number of class initiators available using the format [<CLASSNAME>:<CLASSCOUNT>]. This is most commonly seen in the output of node status commands indicating the number of configured and available class initiators, or in job status commands when displaying class initiator requirements.

Nodes can also be configured to support various arbitrary resources. Information about such resources can be specified using the NODECFG parameter. For example, a node may be configured to have "256 MB RAM, 4 processors, 1 GB Swap, and 2 tape drives".

We next turn to the concept of reservations. There are several types of reservations which sites typically deal with. The first, administrative reservations, are typically one-time reservations created for special purposes and projects. These reservations are created using a command that sets a reservation. These reservations provide an integrated mechanism to allow graceful management of unexpected system maintenance, temporary projects, and time critical demonstrations. This command allows an administrator to select a particular set of resources or just specify the quantity of resources needed. For example, an administrator could use a regular expression to request a reservation be created on the nodes 'blue0[1-9]' or could simply request that the reservation locate the needed resources by specifying a quantity based request such as 'TASKS=20'.

Figure 2A:
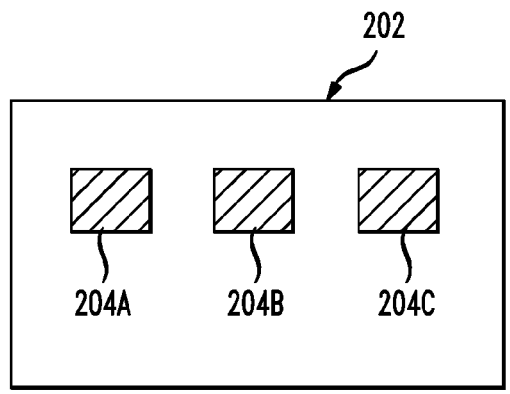
FIG. 2A illustrates a plurality of reservations made for compute resources.

Another type of reservation is called a standing reservation. This is shown in FIG. 2A. A standing reservation is useful for recurring needs for a particular type of resource distribution. For example, a site could use a standing reservation to reserve a subset of its compute resources for quick turnaround jobs during business hours on Monday thru Friday. Standing reservations are created and configured by specifying parameters in a configuration file.

As shown in FIG. 2A, the compute environment 202 includes standing reservations shown as 204A, 204B and 204C. These reservations show resources allocated and reserved on a periodic basis. These are, for example, consuming reservations meaning that cluster resources will be consumed by the reservation. These reservations are specific to a user or a group of users and allow the reserved resources to be also customized specific to the workload submitted by these users or groups. For example, one aspect of the invention is that a user may have access to reservation 204A and not only submit jobs to the reserved resources but request, perhaps for optimization or to meet preferred criteria as opposed to required criteria, that the resources within the reservation be modified by virtual partitioning or some other means to accommodate the particular submitted job. In this regard, this embodiment of the invention enables the user to submit and perhaps request modification or optimization within the reserved resources for that particular job. There may be an extra charge or debit of an account of credits for the modification of the reserved resources. The modification of resources within the reservation according to the particular job may also be performed based on a number of factors discussed herein, such as criteria, class, quality of service, policies etc.

Standing reservations build upon the capabilities of advance reservations to enable a site to enforce advanced usage policies in an efficient manner. Standing reservations provide a superset of the capabilities typically found in a batch queuing system's class or queue architecture. For example, queues can be used to allow only particular types of jobs access to certain compute resources. Also, some batch systems allow these queues to be configured so that they only allow this access during certain times of the day or week. Standing reservations allow these same capabilities but with greater flexibility and efficiency than is typically found in a normal queue management system.

Standing Reservations provide a mechanism by which a site can dedicate a particular block of resources for a special use on a regular daily or weekly basis. For example, node X could be dedicated to running jobs only from users in the accounting group every Friday from 4 to 10 PM. A standing reservation is a powerful means of controlling access to resources and controlling turnaround of jobs.

Another embodiment of reservation is something called a reservation mask, which allows a site to create "sandboxes" in which other guarantees can be made. The most common aspects of this reservation are for grid environments and personal reservation environments. In a grid environment, a remote entity will be requesting resources and will want to use these resources on an autonomous cluster for the autonomous cluster to participate. In many cases it will want to constrain when and where the entities can reserve or utilize resources. One way of doing that is via the reservation mask.

Figure 2B:
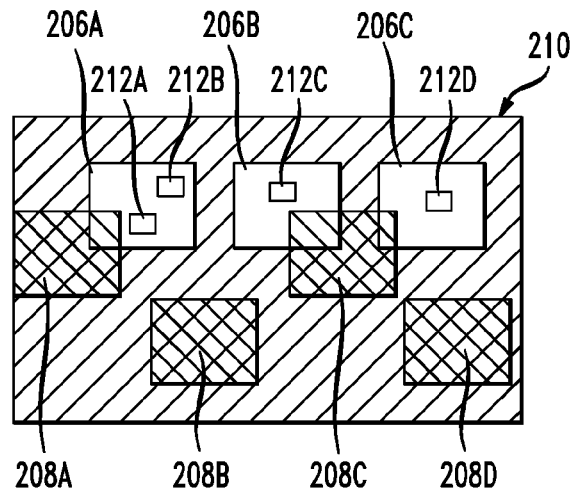
FIG. 2B illustrates a plurality of reservations and jobs submitted within those reservations.

FIG. 2B illustrates the reservation mask shown as creating sandboxes 206A, 206B, 206C in compute environment 210 and allows the autonomous cluster to state that only a specific subset of resources can be used by these remote requesters during a specific subset of times. When a requester asks for resources, the scheduler will only report and return resources available within this reservation, after which point the remote entity desires it, it can actually make a consumption reservation and that reservation is guaranteed to be within the reservation mask space. The consumption reservations 212A, 212B, 212C, 212D are shown within the reservation masks.

Another concept related to reservations is the personal reservation and/or the personal reservation mask. In compute environment 210, the reservation masks operate differently from consuming reservations in that they are enabled to allow personal reservations to be created within the space that is reserved. ACL's are independent inside of a sandbox reservation or a reservation mask in that you can also exclude other requesters out of those spaces so they're dedicated for these particular users.

One benefit of the personal reservation approach includes preventing local job starvation, and providing a high level of control to the cluster manager in that he or she can determine exactly when, where, how much and who can use these resources even though he doesn't necessarily know who the requesters are or the combination or quantity of resources they will request. The administrator can determine when, how and where requestors will participate in these clusters or grids. A valuable use is in the space of personal reservations which typically involves a local user given the authority to reserve a block of resources for a rigid time frame. Again, with a personal reservation mask, the requests are limited to only allow resource reservation within the mask time frame and mask resource set, providing again the administrator the ability to constrain exactly when and exactly where and exactly how much of resources individual users can reserve for a rigid time frame. The individual user is not known ahead of time but it is known to the system, it is a standard local cluster user.

The reservation masks 206A, 206B and 206C define periodic, personal reservation masks where other reservations in the compute environment 210 may be created, i.e., outside the defined boxes. These are provisioning or policy-based reservations in contrast to consuming reservations. In this regard, the resources in this type of reservation are not specifically allocated but the time and space defined by the reservation mask cannot be reserved for other jobs. Reservation masks enable the system to be able to control the fact that resources are available for specific purposes, during specific time frames. The time frames may be either single time frames or repeating time frames to dedicate the resources to meet project needs, policies, guarantees of service, administrative needs, demonstration needs, etc. This type of reservation insures that reservations are managed and scheduled in time as well as space. Boxes 208A, 208B, 208C and 208D represent non-personal reservation masks. They have the freedom to be placed anywhere in cluster including overlapping some or all of the reservation masks 206A, 206B, 206C. Overlapping is allowed when the personal reservation mask was setup with a global ACL. To prevent the possibility of an overlap of a reservation mask by a non-personal reservation, the administrator can set an ACL to constrain it is so that only personal consumption reservations are inside. These personal consumption reservations are shown as boxes 212B, 212A, 212C, 212D which are constrained to be within the personal reservation masks 206A, 206B, 206C. The 208A, 208B, 208C and 208D reservations, if allowed, can go anywhere within the cluster 210 including overlapping the other personal reservation masks. The result is the creation of a "sandbox" where only personal reservations can go without in any way constraining the behavior of the scheduler to schedule other requests.

All reservations possess a start and an end time which define the reservation's active time. During this active time, the resources within the reservation may only be used as specified by the reservation ACL. This active time may be specified as either a start/end pair or a start/duration pair. Reservations exist and are visible from the time they are created until the active time ends at which point they are automatically removed.

For a reservation to be useful, it must be able to limit who or what can access the resources it has reserved. This is handled by way of an access control list, or ACL. With reservations, ACL's can be based on credentials, resources requested, or performance metrics. In particular, with a standing reservation, the attributes userlist, grouplist, accountlist, classlist, qoslist, jobattrlist, proclimit, timelimit and others may be specified.

Figure 3:
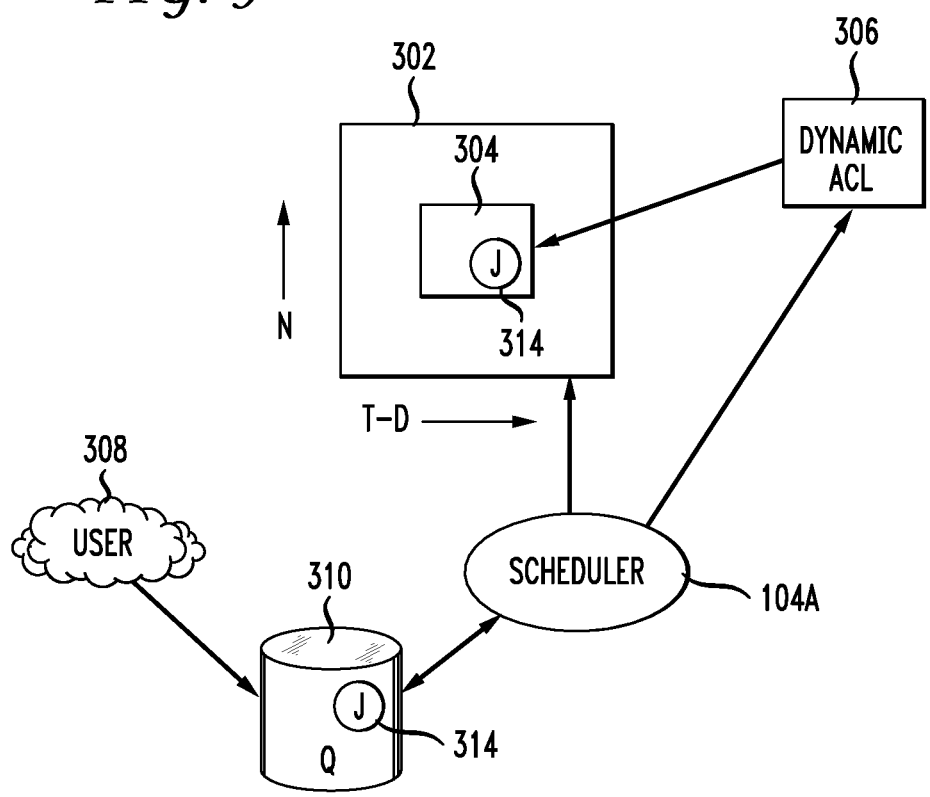
FIG. 3 illustrates a dynamic access control list.

FIG. 3 illustrates an aspect of the present invention that allows the ACL 306 for the reservation 304 to have a dynamic aspect instead of simply being based on who the requester is. The ACL decision-making process is based at least in part on the current level of service or response time that is being delivered to the requester. To illustrate the operation of the ACL 306, assume that a user 308 submits a job 314 to a queue 310 and that the ACL 306 reports that the only job that can access these resources 302 are those that have a queue time that currently exceeds two hours. The resources 302 are shown with resources N on the y axis and time on the x axis. If the job 314 has sat in the queue 310 for two hours it will then access the additional resources to prevent the queue time for the user 308 from increasing significantly beyond this time frame. The decision to allocate these additional resources can be keyed off of utilization of an expansion factor and other performance metrics of the job. For example, the reservation 304 may be expanded or contracted or migrated to cover a new set of resources.

Whether or not an ACL 306 is satisfied is typically and preferably determined the scheduler 104A. However, there is no restriction in the principle of the invention regarding where or on what node in the network the process of making these allocation of resource decisions occurs. The scheduler 104A is able to monitor all aspects of the request by looking at the current job 314 inside the queue 310 and how long it has sat there and what the response time target is and the scheduler itself determines whether all requirements of the ACL 306 are satisfied. If requirements are satisfied, it releases the resources that are available to the job 314. A job 314 that is located in the queue and the scheduler communicating with the scheduler 104A. If resources are allocated, the job 314 is taken from the queue 310 and inserted into the reservation 314 in the cluster 302.

An example benefit of this model is that it makes it significantly easier for a site to balance or provide guaranteed levels of service or constant levels of service for key players or the general populace. By setting aside certain resources and only making them available to the jobs which threaten to violate their quality of service targets, the system increases the probability of satisfying targets.

When specifying which resources to reserve, the administrator has a number of options. These options allow control over how many resources are reserved and where they are reserved at. The following reservation attributes allow the administrator to define resources.

An important aspect of reservations is the idea of a task. The scheduler uses the task concept extensively for its job and reservation management. A task is simply an atomic collection of resources, such as processors, memory, or local disk, which must be found on the same node. For example, if a task requires 4 processors and 2 GB of memory, the scheduler must find all processors AND memory on the same node; it cannot allocate 3 processors and 1 GB on one node and 1 processor and 1 GB of memory on another node to satisfy this task. Tasks constrain how the scheduler must collect resources for use in a standing reservation, however, they do not constrain the way in which the scheduler makes these cumulative resources available to jobs. A job can use the resources covered by an accessible reservation in whatever way it needs. If reservation X allocated 6 tasks with 2 processors and 512 MB of memory each, it could support job Y which requires 10 tasks of 1 processor and 128 MB of memory or job Z which requires 2 tasks of 4 processors and 1 GB of memory each. The task constraints used to acquire a reservation's resources are completely transparent to a job requesting use of these resources. Using the task description, the taskcount attribute defines how many tasks must be allocated to satisfy the reservation request. To create a reservation, a taskcount and/or a hostlist may be specified.

A hostlist constrains the set of resource which are available to a reservation. If no taskcount is specified, the reservation will attempt to reserve one task on each of the listed resources. If a taskcount is specified which requests fewer resources than listed in the hostlist, the scheduler will reserve only the number of tasks from the hostlist specified by the taskcount attribute. If a taskcount is specified which requests more resources than listed in the hostlist, the scheduler will reserve the hostlist nodes first and then seek additional resources outside of this list.

Reservation flags allow specification of special reservation attributes or behaviors. Supported flags are listed in table 2 below.

TABLE 2

| Flag Name | Description |
| --- | --- |
| BESTEFFORT | N/A |
| BYNAME | reservation will only allow access to jobs which meet reservation ACL's and explicitly request the resources of this reservation using the job ADVRES flag |
| IGNRSV | request will ignore existing resource reservations allowing the reservation to be forced onto available resources even if this conflicts with other reservations. |
| OWNERPREEMPT | job's by the reservation owner are allowed to preempt non-owner jobs using reservation resources |
| PREEMPTEE | Preempts a job or other object |
| SINGLEUSE | reservation is automatically removed after completion of the first job to use the reserved resources |
| SPACEFLEX | reservation is allowed to adjust resources allocated over time in an attempt to optimize resource utilization |
| TIMEFLEX | reservation is allowed to adjust the reserved timeframe in an attempt to optimize resource utilization |

Reservations must explicitly request the ability to float for optimization purposes by using a flag such as the SPACEFLEX flag. The reservations may be established and then identified as self-optimizing in either space or time. If the reservation is flagged as such, then after the reservation is created, conditions within the compute environment may be monitored to provide feedback on where optimization may occur. If so justified, a reservation may migrate to a new time or migrate to a new set of resources that are more optimal than the original reservation.

Figure 4:
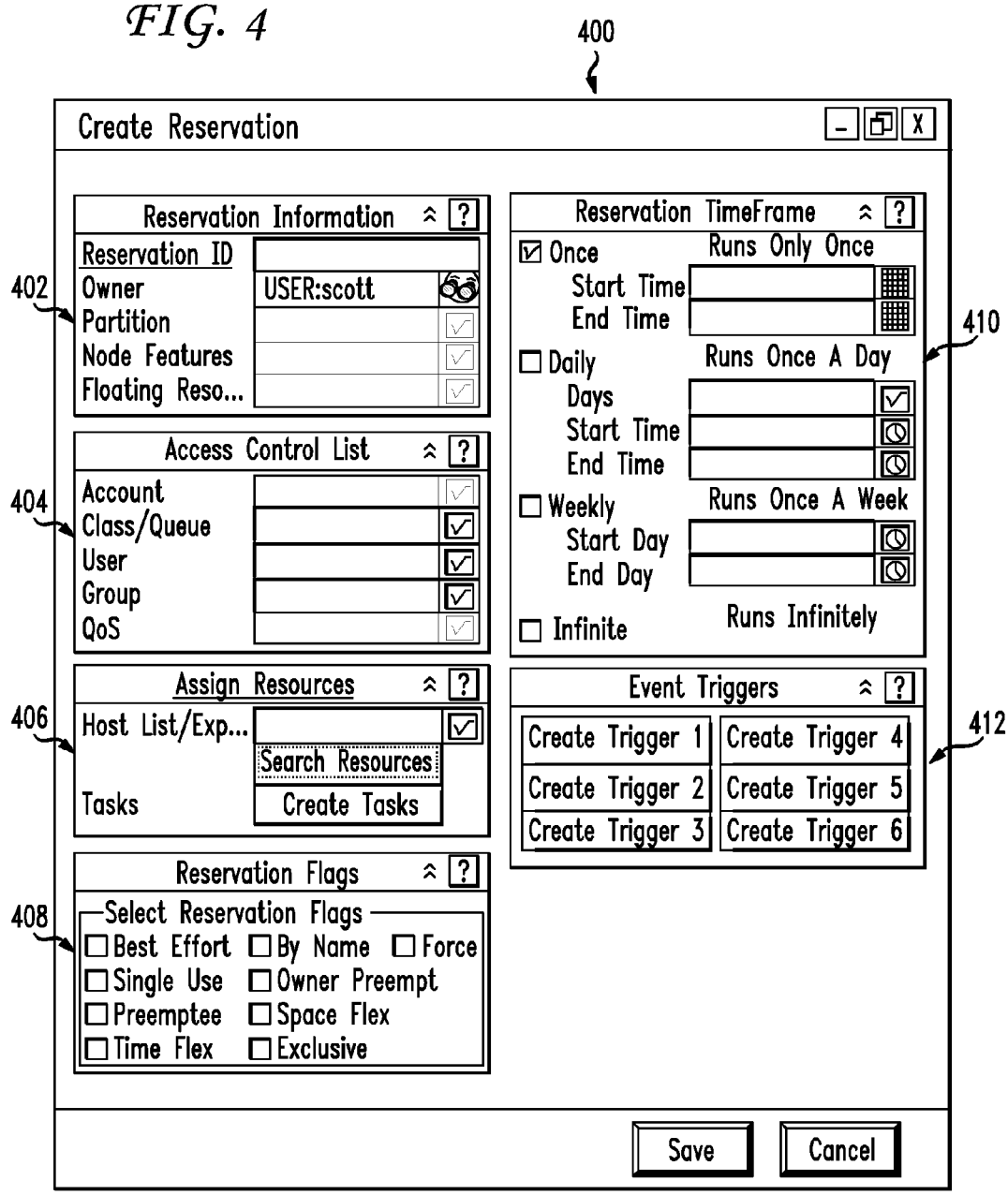
FIG. 4 illustrates a reservation creation window.

FIG. 4 illustrates a reservation creation window 400 that includes the use of the flags in Table 2. A user Scott input reservation information in a variety of fields 402 for name, partition, node features and floating reservation. Each of these input fields includes a drop-down menu to enable the selection of options easy. An access control list input field 404 allows the user to input an account, class/queue, user, group and QoS information. Resources may be assigned and searched and tasks created 406 and reservation flags set 408, such as best effort, single use, preemptee, time flex, by name, owner preempt, space flex, exclusive and force. These flags set parameters that may cause the reservation to be optimized such as in time or space where it migrates to a new time or over new resources based on monitored events or other feedback.

A reservation time-frame 410 may also be input such as one, daily, weekly, with start and end times for the reservation. Menu drop down calendars and clocks are available for easily enabling the user to view and graphically input and select the various timeframe parameters. Event triggers may also be input wherein the user can create one or more triggers associated with the reservation. As generally shown in FIG. 4, the use of a graphical interface simplifies the reservation-creation process for the administrator or user.

Figure 5:
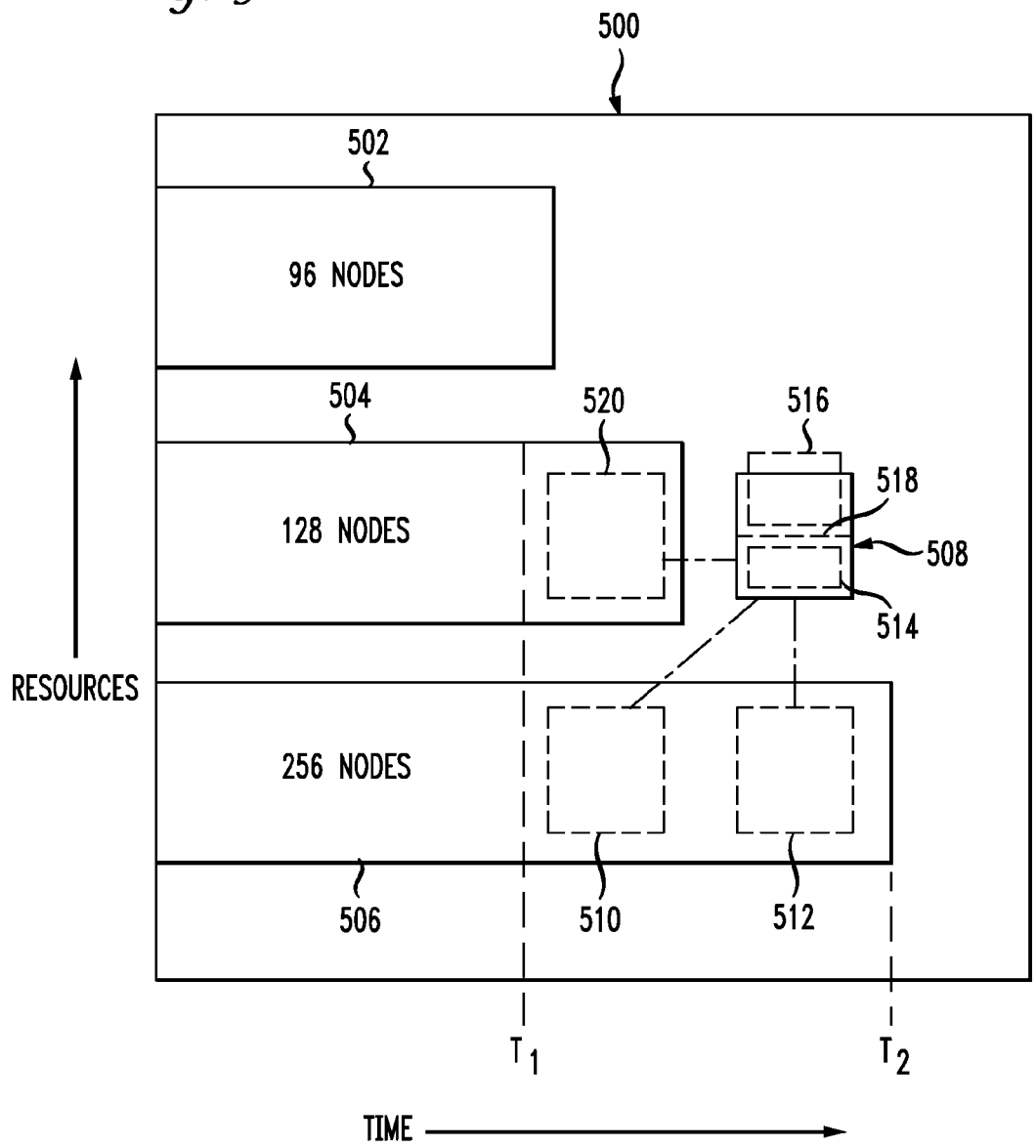
FIG. 5 the co-allocation process.

FIG. 5 illustrates a process of generating a co-allocation mapping for a co-allocation query. The co-allocation reservation allows one to reserve resources which span multiple different resource types, for instance a requestor can reserve nodes with four nodes of a particular operating system with 6 nodes that have at least a gig of memory available and the requestor can pull those together into a single reservation basically allowing one to co-allocate these various resources and guarantee their availability.

To illustrate this aspect of the invention, assume in this case that a co-allocation request was submitted to the system which identifies a first request (R1) 502 and a second request (R2) 504. These are requests to query the compute resources 500 and return information regarding available resources for reservation. The areas 506, 508, 510, and 512 represent identified resources that may be reserved according to R1 and/or R2.

Graph 514 illustrates the result of the query for R1. The x-axis represents time and the y-axis represents resources, such as processors or a set of resources like processors and network bandwidth. Each part of the mapping 516, 518 is shown with a height reflecting the resources available and has a width 517 in time that reflects the time frame (start time and end time) at which those resources may be available for reservation. Similarly, graph 520 shows a query for R2 with its sets of data reflecting resources available with time frames of availability 522. These mappings include an analysis of constraints and guarantees associated with each request and each user. Graph 524 then represents a union or intersection of mappings for R1 and R2 to generate a mapping of where the resources are and when the resources can be co-allocated according to the co-allocation request.

The resulting mapping 524 illustrates that in this case, there are three options 526, 528 and 530 from which the user can select or a system can automatically select which resulting mapping will be committed for an actual reservation of those resources. This mapping represents a co-allocation map between the first group of resources for R1 and a second group of resources associated with R2.

This capability is very valuable in terms of grid environments but also dynamic hosting environment and in cluster environments as well. In order to enable a co-allocation reservation you actually have to break it into at least two steps depending on the number of unions of resources that need to be allocated. This is done using algorithms that form of range calculus allowing one to actually evaluate each unique resource request independently and determine the quantity or resources and the time frames during which those resources are available so as to satisfying that dimension or that aspect of the request at each aspect of the request.

Figure 6:
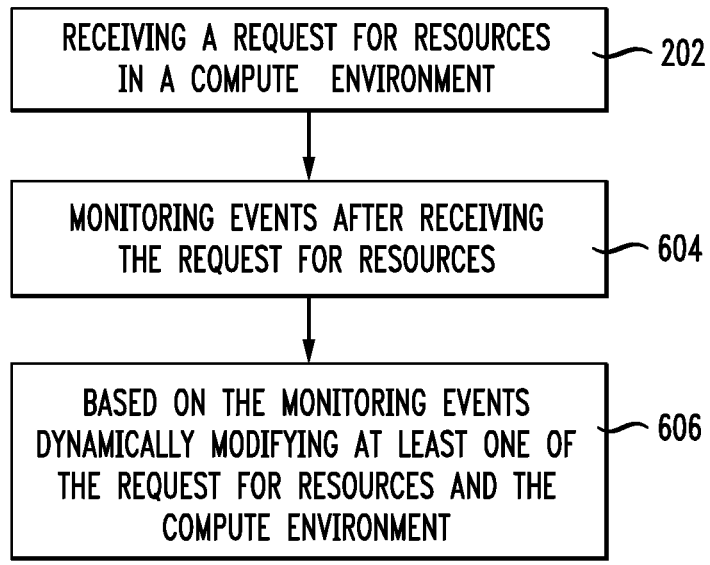
FIG. 6 illustrates a method aspect.
Figure 7:
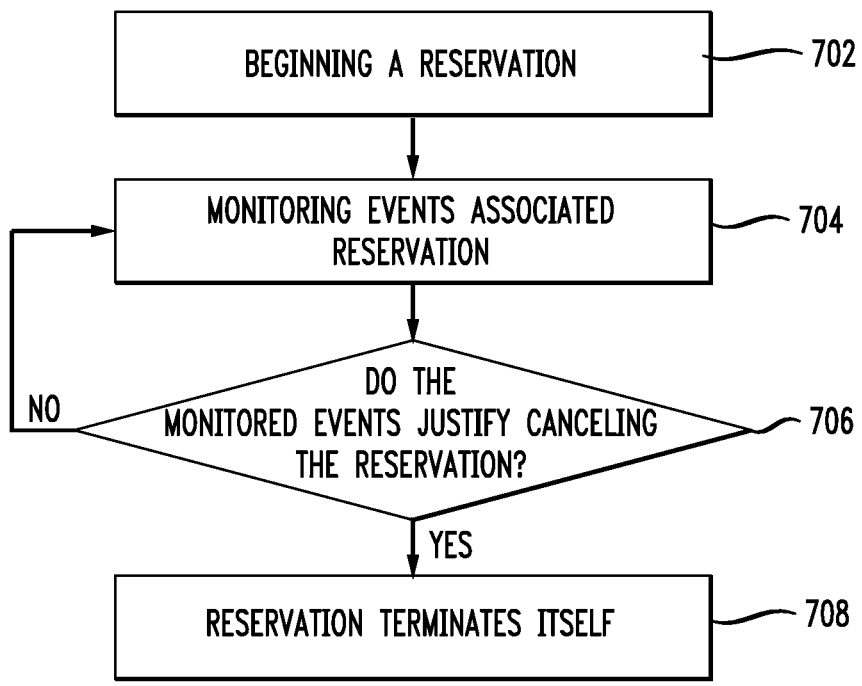
FIG. 7 illustrates another method aspect.

FIG. 6 illustrates a method embodiment of the co-allocation reservation. Suppose a requestor asks for a reservation of two nodes with operating system X and two nodes with operating system Y for a period of time such as one hour. These resources that are requested may have attributes such as disk storage space, memory, license scope, network bandwidth capability, clock speed and central processing power. Other attributes may exist as well to characterize compute resources. The request includes two types of resources. The requests may relate to one of a job description, at least one time frame availability, a description of minimum resources necessary to meet the request, a description of resource types and attributes, a reservation duration minimum (say it needs to complete a submitted job in one hour or a reservation made according to this request should be no shorter than two hours). Other included features may include preferred criteria (I would like to finish a submitted job in ½ hour).

The method comprises receiving a first request for a reservation of a first type of resource (602). The first type of resource may have an attribute such as, for example, one of disk storage space, memory, license scope, network bandwidth capability, clock speed and central processing power.

The system evaluates all the constraints and the other guarantees that the scheduler has already made and resources and the time frames during which they are available to satisfy that full hour request and the particular resource constraint (604) (i.e., the operating system X). The constraints may be at least one of resource matching in terms of type, attribute or quantity. They may also include guarantees associated with the first request and the second request relate to resource-based policies or to time-based policies. For example, the time-based policies may limit requestors to a pre-determined quantity of resources at any given moment in time.

The system identifies a first group of resources that meet the request and stores that in a first list (606). This list represents, for example, the resources that are available from time A to time B, time frame C to time frame D, time frame E to time frame F. This concept is reflected in graph 514 of FIG. 5. Once that list is established, the system receives a second request for a reservation of a second type of resource (608) and analyses the constraints and guarantees associated with the second request (610). This mapping is a series of ranges during which the second type of resource is available and stores that in a second list, represented in graph 520. The system then identifies a second group of resources that meet the second request (612) and generates a co-allocation mapping between the first group of resources and the second group of resources (614). The generated map represents a reduced map of quantities of resources that can simultaneously satisfy the first request and the second request. The height of the generated map may or may not represent a resource quantity.

In a preferred embodiment, the height of the generated map is a Boolean indication of whether resource are available that can meet both requests or not. The generated map also represents all time frames representing available resources that satisfy the first request and the second request.

The step of identifying the first group of resources and the second group of resources may also relate to analyzing events associated with the first request and the second request and how resource availability changes over time. This feature is also illustrated in FIG. 5. These events that are analyzed may comprise at least one of job start, job completion, state change, boundaries of reservations or other parameters, reservations and policy enforcement limits. Other factors that may play a role in the identification of parameters include cost, quality of information data, resource quantity data, time frame data and resource quality data.

There may further be an iterative approach that takes advantage of the generated co-allocation map. For example, an aspect of the invention utilizes this information by performing again under constraints associated with the co-allocation map the step of identifying a first group and/or a second group of resources that meet the first or respective second request.

The method may also comprise receiving a request for a reservation for a first type of resource further by receiving a request for the first type of resource for a first time frame and wherein the identifying and analyzing steps for the first type of resource take into account the first time frame. Similarly, the step of receiving a request for a reservation for a second type of resource may further comprise receiving a request for the second type of resource for a second time frame, wherein the identifying and analyzing steps for the second type of resource take into account the second time frame. In this case, the step of generating the co-allocation map between the first group of resources and the second group of resources then further comprises calculating an intersection of the first time frame and the second time frame.

The system processes the lists via an algorithm that calculates the intersection of these ranges and determines a new resulting range which is the intersection that meets all the time frame and resource quantity constraints. The range may be purely a time range of available resources or a time and resource range. The result is an additional range that includes the additional co-allocation aspects that need to be considered. The algorithm continues to take the intersection of the resulting intersection of a previous request with a new request and arrives at an ultimate range that incorporates all resource requests. In this regard, more than two requests may be made for resources and a process may be repeated to identify a range that considers all requests.

The resulting co-allocation is a resource availability range list. This list may also be termed an array of events describing the intersecting time frames. The array of events may comprise at least one of resource quantity, resource quality, time frames, quality of information and cost. From that range list, the system can reserve compute resources that therefore best satisfy the needs of the requestor according to the request. In one aspect of the invention, before reserving compute resources, the system presents to a requestor of a reservation of the first and second type of resources an analysis of the compute resources and the reservation. The presented analysis may relate to a quantity and quality of the cluster resources in relation to the request for a reservation for resources. In this way, the requestor may have the option to make changes to the request or the jobs to be submitted to the reserved resources, and so forth. The compute resources may be on-demand resources, grid resources or cluster environment resources. Within each of these contexts, the compute resources further may be disk storage, network bandwidth, memory resources, licensing resources, operating system, software modules and/or provisioning resources.

If all the intersection comparisons do not result in being able to deliver the quality of service, then the quality of service is going to be an independent parameter that will be separately calculated. For example, the first step is to determine feasibility, what resources are available, what are the time-frames, and then if those time frames cannot be satisfied, the resulting time frames that are available within the quality of service that's requested. The system can then determine to give additional resource access and privileges to the request. Again, the evaluation is performed with the super-set of resources and super-set of services. If the system can meet the request at a higher cost or a higher quality of service, then the new reservation is made for the identified resources to meet the promised criteria.

There are other aspects of the co-allocation reservation. For example, the system may receive a request for a reservation for a first type of resource which includes a request for the first type of resource for a first given time frame. If this is the case, then the step of identifying and analyzing steps for the first type of resource will take into account the first given time frame. In addition, the request for a reservation for a second type of resource may include a request for the second type of resource for a second given time frame. Also, if this is the case, then the method comprises take into account the second given time frame when performing the identifying and analyzing steps of the method. With these new time frames, the method comprise calculating a co-allocation parameter between the first group of resources and the second group of resources further comprises calculating the co-allocation parameter of the first given time frame and the second given time frame.

Examples of the basis for the co-allocation parameter include an interaction, a union or a distinct response. For example, if one has three nodes and the first node has a feature A, the second node has feature B and the third node has feature A and C. If the requestor wants to distinct responses from the request for a reservation (such as for my first request I want nodes with feature A shown and with my second request I want nodes with feature B shown), then if the system were to perform an intersection analysis, then it would return a list of A, B and C. If the system were to return a union analysis, it would list A, B and C. However, if the system were to return a distinct response, it would provide A for a first grouping and then B and C in a second grouping; or A and C in the first grouping and B in the second grouping. In this regard, the intersection space used to identify matches can provide more than one response to one request. The system can intelligently split up these possible solutions and feed to a response to the requestor according to the size of, or quantity or resources requested and the degree of fulfillment of that request with the available resources. For example, the requestor may see if a list of resources for host X with its features or host Y and its features or host Z and its features that could the solution to the request.

The requestor may select that calculating the co-allocation parameter also returns an analysis according to at least one of the interaction, union or distinct response. The analysis returned to the requestor, according to at least one of the interaction, union or distinct response, may correspond to an analysis of the quantity or quality of resources and a degree of fulfillment of the request according to available resources. The returned analysis may also comprise a list of resources that can fulfill the request and a transaction ID associated with the analysis. The transaction ID may then be used to present to the requestor an option to submit the request with reference to the transaction ID. In this regard, the response may be: Transaction ID 1: 3 nodes at 4 pm; Transaction ID 2: 4 nodes at 5 pm; and Transaction ID 3: 4 nodes at 12 am. The user can then commit the request and create a reservation based on a transaction ID. The requestor may also submit a revised request for resources based on the returned analysis, if for example, the analysis shows that there are no resources available within a day and the user desires to start jobs earlier than that time.

Another aspect of the co-allocation of reservations relates to identifying a request with a flag related to exclusion. This is an option identified in the reservation flags options 408 in FIG. 4. The exclusive flag or parameter may be identified with one or more requests for resources. In this regard, the generated map of co-allocated resources represents a set of resources exclusive to at least one of the first request or the second request. With an exclusive parameter attached to the first request, the method may further include guaranteeing that the first request will be able to reserve exclusive resources. The method may further comprise generating a co-allocation map between the first group of resources and the second group of resources.

An example will assist in understating the co-allocation exclusion request. With reference to FIG. 5, assume a first request R1 requests a first set of resources and R2 requests a second set of resources. At least one request is set with the exclusive flag. Setting this flag changes the analysis and mapping and the end results when a reservation is committed. The exclusive analysis includes analyzing R1 during the co-allocation time frame identified and bounded in the union analysis 532 and identifying an R1 list 1 and an R1 list 2 bounded by the union time frame 532, and identifying an R2 list 1 and an R2 list 2 in the bounded time frame 532. (There may also be time frames for mappings 528 and 530 with analysis as well). An analysis is done to generate these lists called a multi-request distribute balance tasks that steps through and provides resources to the lists according to the most needy request. The result of the analysis is a transaction ID (1) for R1 which represents available resources for R1 during the union time frame 532 and a transaction ID (2) for R2 representing available resources for R2 for the time frame 532. But the underlying analysis, and what is hidden inside these transaction IDs, is a mapping in each case to an explicit set of resources. If the user then commits the co-allocation request, the reservation for this query will reserve two different explicit sets of resources guaranteed to not overlap associated with the two transaction IDs.

With this in mind, an aspect of the exclusion embodiment of the invention relates to a method of co-allocating resources within a compute environment. The method comprises receiving a first request for a reservation for a first type of resource, analyzing constraints and guarantees associated with the first request, identifying a first group of resources that meet the request for the first type of resource, receiving a second request for a reservation for a second type of resource, analyzing constraints and guarantees associated with the second request, identifying a second group of resources that meet the request for the second type of resource and generating a set of resources exclusive to at least one of the first request or the second request.

The first request may specify exclusivity and if so, the system may respond with a guarantee that the first request will be able to reserve exclusive resources. In this scenario, the system may then generate a co-allocation map between the first group of resources and the second group of resources.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method of co-allocating resources within a compute environment, the method comprising:
    receiving via a processor a first request for a reservation for a first type of resource in a compute environment comprising a plurality of networked computing devices;
    analyzing via the processor first constraints and service level agreement guarantees associated with the first request and related to use of the plurality of networked computing devices within the compute environment;
    identifying via the processor a first group of resources that meets the first request for the first type of resource;
    receiving via the processor a second request for a reservation for a second type of resource in the compute environment;
    analyzing via the processor second constraints and the service level agreement guarantees associated with the second request and related to use of the plurality of networked computing devices within the compute environment;
    identifying via the processor a second group of resources that meets the request for the second type of resource, wherein the first type of resource and second type of resource span one or more servers each having a homogeneous processor architecture; and
    generating via the processor a set of resources exclusive to at least one of the first request and the second request.

2. The method of claim 1, wherein the first request specifies exclusivity of the first group of resources for the first request.

3. The method of claim 2, wherein if exclusivity is requested, the method comprises guaranteeing that the first request will be able to reserve exclusive resources.

4. A method of co-allocating resources within a compute environment, the method comprising:
    receiving a first request for a reservation for a first type of resource in a compute environment comprising a plurality of networked computing devices;
    analyzing first constraints and service level agreement guarantees associated with the first request, the first constraints and guarantees related to use of the compute environment;
    identifying a first group of resources that meet the first request;
    receiving a second request for a reservation for a second type of resource in the compute environment;
    analyzing second constraints and service level agreement guarantees associated with the second request and related to use of the compute environment, wherein the first type of resource and second type of resource span at least one computing device of the plurality of networked computing devices, wherein each computing device of the plurality of networked computing devices has a homogeneous processor architecture;

identifying a second group of resources that meet the second request; and generating a co-allocation map between the first group of resources and the second group of resources, wherein the first constraints, the second constraints and the service level agreement guarantees associated with the first request and the second request relate to time-based policies which limit requestors to a pre-determined quantity of resources at any given moment in time.

5. The method of claim 4, further comprising reserving resources according to the co-allocation map.

6. The method of claim 4, wherein generating the co-allocation map comprises identifying a reduced map of quantities of resources that can simultaneously satisfy the first request and the second request.

7. The method of claim 4, wherein the first and second types of resources comprise at least one of: compute resources, disk storage resources, network bandwidth resources, memory resources, and licensing resources.

8. The method of claim 4, wherein generating the co-allocation map further comprises identifying an intersection of an availability of each of the first type of resource and the second type of resource.

9. The method of claim 4, further comprising:
generating a resulting array of events describing the intersecting time frames.

10. The method of claim 9, wherein the resulting array of events comprises at least one of resource quantity, resource quality, time frames, quality of information and cost.

11. The method of claim 4, wherein the first request and the second request comprise at least one of: a job description, at least one time frame availability, a description of minimum resources, a description of resource types and attributes, and a reservation duration minimum.

12. The method of claim 4, wherein identifying the first group of resources and the second group of resources further comprises analyzing events associated with the first request and the second request and how resource availability changes over time.

13. The method of claim 12, wherein the events comprise at least one of job start, job completion, state change, boundaries, reservations, and policy enforcement limits.

14. The method of claim 4, further comprising reporting at least one of the following parameters associated with the identified first and second group of resources: cost, quality of information data, resource quantity data, time frame data, and resource quality data.

15. The method of claim 4, further comprising:
performing again, under constraints identified by the co-allocation map, the step of identifying a first group of resources that meet the request for the first type of resource.

16. A system for co-allocating resources within a compute environment, the system comprising:
a processor;
a first module controlling the processor to receive a first request for a reservation for a first type of resource in a compute environment comprising a plurality of networked computing devices;
a second module controlling the processor to analyze first constraints and service level agreement guarantees associated with the first request, the first constraints and service level agreement guarantees related to use of the compute environment;
a third module controlling the processor to identify a first group of resources that meet the request for the first type of resource;

a fourth module controlling the processor to receive a second request for a reservation for a second type of resource in the compute environment;
a fifth module controlling the processor to analyze second constraints and service level agreement guarantees associated with the second request, the second constraints and service level agreement guarantees related to use of the compute environment, wherein the first type of resource and second type of resource span at least one computing device of the plurality of networked computing devices, wherein each computing device of the plurality of networked computing device has a homogeneous processor architecture;
a sixth module controlling the processor to identify a second group of resources that meet the request for the second type of resource; and
a seventh module controlling the processor to generate a co-allocation map between the first group of resources and the second group of resources, wherein the first constraints, the second constraints and the service level agreement guarantees associated with the first request and the second request relate to time-based policies which limit requestors to a pre-determined quantity of resources at any given moment in time.

17. A non-transitory computer-readable medium storing instructions for controlling a computing device to co-allocate resources within a compute environment, the instructions causing the computing device to perform steps comprising:
receiving a first request for a reservation for a first type of resource in a compute environment comprising a plurality of networked computing devices;
analyzing first constraints and service level agreement guarantees associated with the first request, the first constraints and service level agreement guarantees related to use of the compute environment;
identifying a first group of resources that meet the request for the first type of resource;
receiving a second request for a reservation for a second type of resource in the compute environment;
analyzing second constraints and service level agreement guarantees associated with the second request, the second constraints and service level agreement guarantees related to use of the compute environment, wherein the first type of resource and second type of resource span at least one computing device of the plurality of computing devices, wherein each computing device of the at least one computing device has a homogeneous processor architecture;
identifying a second group of resources that meet the request for the second type of resource; and
generating a co-allocation map between the first group of resources and the second group of resources, wherein the first constraints, the second constraints and the service level agreement guarantees associated with the first request and the second request relate to time-based policies which limit requestors to a pre-determined quantity of resources at any given moment in time.

18. A system comprising:
a processor; and
a computer-readable storage medium storing instructions which, when executed by the processor, cause the processor to perform a method comprising:
receiving via a processor a first request for a reservation for a first type of resource in a compute environment comprising a plurality of networked computing devices;
analyzing via the processor first constraints and service level agreement guarantees associated with the first request and related to use of the plurality of networked computing devices within the compute environment;

identifying via the processor a first group of resources that meets the first request for the first type of resource;

receiving via the processor a second request for a reservation for a second type of resource in the compute environment;

analyzing via the processor second constraints and the service level agreement guarantees associated with the second request and related to use of the plurality of networked computing devices within the compute environment;

identifying via the processor a second group of resources that meets the request for the second type of resource, wherein the first type of resource and second type of resource span one or more servers each having a homogeneous processor architecture; and generating via the processor a set of resources exclusive to at least one of the first request and the second request.

19. A system comprising:

a processor; and a computer-readable storage medium storing instructions which, when executed by the processor, cause the processor to perform a method comprising:

receiving a first request for a reservation for a first type of resource in a compute environment comprising a plurality of networked computing devices;

analyzing first constraints and service level agreement guarantees associated with the first request, the first constraints and guarantees related to use of the compute environment;

identifying a first group of resources that meet the first request;

receiving a second request for a reservation for a second type of resource in the compute environment;

analyzing second constraints and service level agreement guarantees associated with the second request and related to use of the compute environment, wherein the first type of resource and second type of resource span at least one computing device of the plurality of networked computing devices, wherein each computing device of the plurality of networked computing devices has a homogeneous processor architecture;

identifying a second group of resources that meet the second request; and generating a co-allocation map between the first group of resources and the second group of resources, wherein the first constraints, the second constraints and the service level agreement guarantees associated with the first request and the second request relate to time-based policies which limit requestors to a pre-determined quantity of resources at any given moment in time.

* * * * *